(12) United States Patent
Zanlongo

(10) Patent No.: US 8,386,354 B2
(45) Date of Patent: Feb. 26, 2013

(54) DETERMINISTIC PRICING MANAGEMENT OF A PORTFOLIO OF ONE OR MORE APPLICATIONS

(75) Inventor: Alejandro R. Zanlongo, Miami, FL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1156 days.

(21) Appl. No.: 11/534,099

(22) Filed: Sep. 21, 2006

(65) Prior Publication Data

US 2008/0126271 A1 May 29, 2008

(51) Int. Cl.
*G06Q 40/00* (2012.01)
(52) U.S. Cl. .................................................. 705/36 R
(58) Field of Classification Search .................. 705/40
See application file for complete search history.

(56) References Cited

U.S. PATENT DOCUMENTS

2004/0128263 A1* 7/2004 Dosanjh ........................ 705/400
2004/0225591 A1* 11/2004 Chiappetta et al. ............. 705/36

OTHER PUBLICATIONS

Database for Elemental Cost Planning. Martin, Joe. AACE International Transactions; 2004. p. IT21.*
Breaking with Tradition. Burmahl, Beth. Health Facilities Management; Feb. 2004; 17, 2; p. 14.*
Plansrooms: Making the Most of Technology. McChristy, Neal. Wide-Format Imaging; Jan. 2005; 13, 1. p. 12.*

* cited by examiner

*Primary Examiner* — Alexander Kalinowski
*Assistant Examiner* — John Preston

(57) ABSTRACT

In certain embodiments, a method for deterministic pricing management of a portfolio of one or more applications comprises, for each of the one or more applications: (1) receiving information associated with the application for a plurality of pricing drivers comprising one or more business pricing drivers and one or more maintainability pricing drivers, each pricing driver associated with a corresponding set of categories; (2) determining, for each business pricing driver and based on the received information, a particular category from the corresponding set of categories for the business pricing driver; (3) generating a business index based on the determined particular categories for the business drivers; (4) generating a maintainability index based on the received information; and (5) generating a composite index based on the generated business and maintainability indices. The method comprises determining one or more pricing bands based on the generated composite indices of the one or more applications, associating each of the applications with a corresponding pricing band, and determining a price for each of the applications based on the corresponding pricing band for the application.

37 Claims, 7 Drawing Sheets

FIG. 3

PRICING DRIVERS

| DRIVER | CATEGORIES | | | | WEIGHT |
|---|---|---|---|---|---|
| INCIDENTS | LOW | MEDIUM | HIGH | | 30% |
| SERVICE | BRONZE | SILVER | GOLD | PLATINUM | 20% |
| CRITICALITY | LOW | MEDIUM | HIGH | CRITICAL | 30% |
| MAINTAINABILITY | VERY HIGH | HIGH | AVERAGE | LOW | VERY LOW | 20% |

FIG. 4

| | BRONZE | SILVER | GOLD | PLATINUM |
|---|---|---|---|---|
| SERVICE WINDOWS | | REGIONS | | |
| NORMAL (7-19 x 5) | ONE | | | |
| EXTENDED (7-19 x 7) | | ONE | | |
| FULL (24 x 7) | | | ONE | GLOBAL |

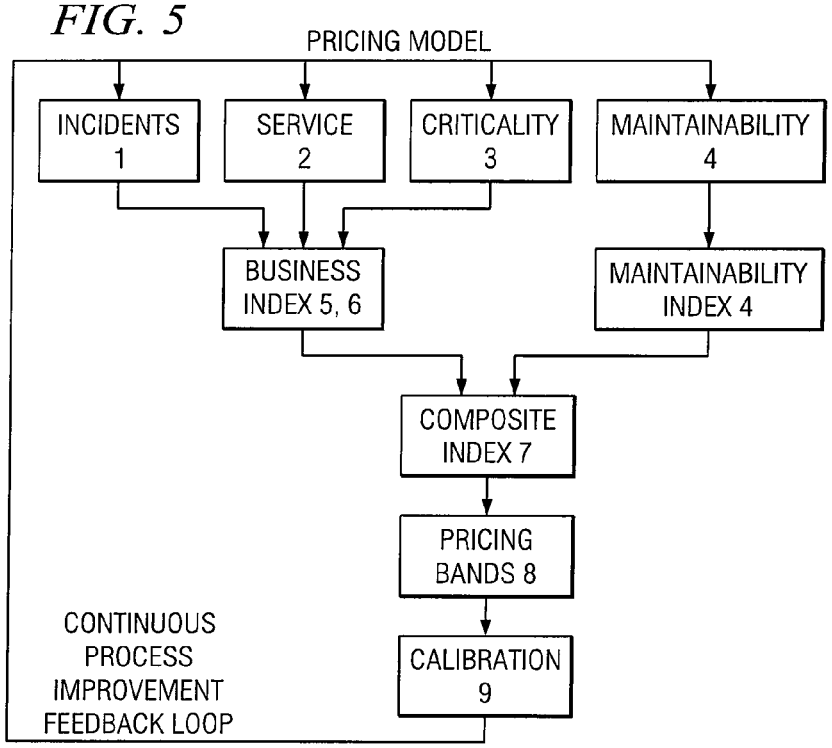
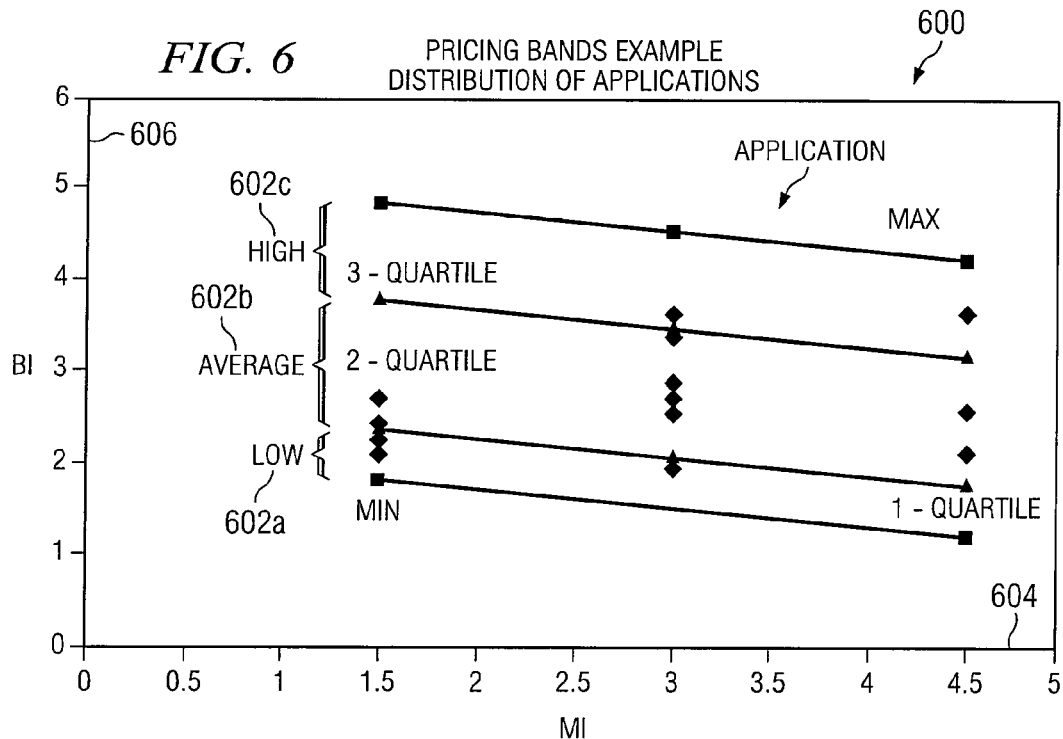

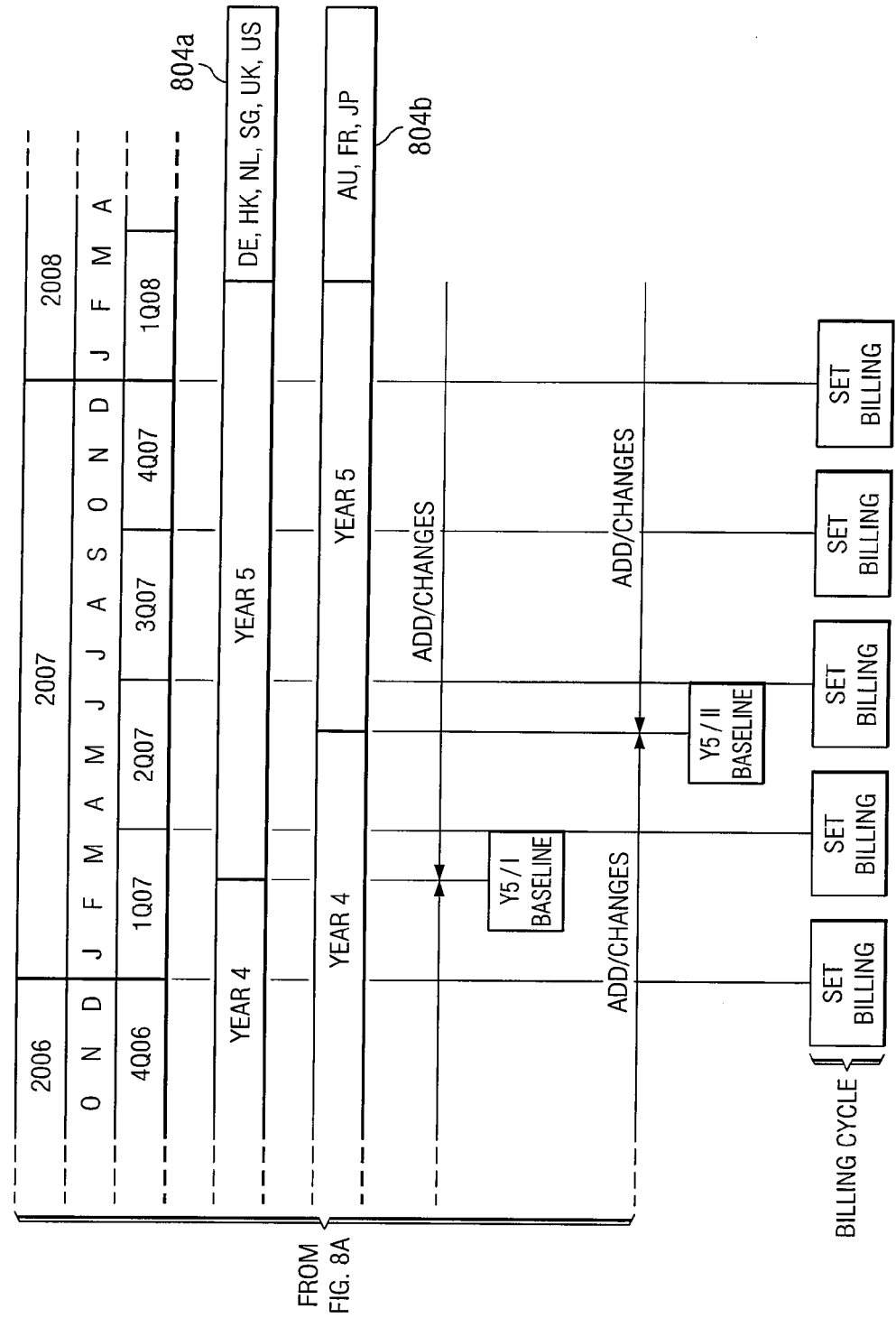

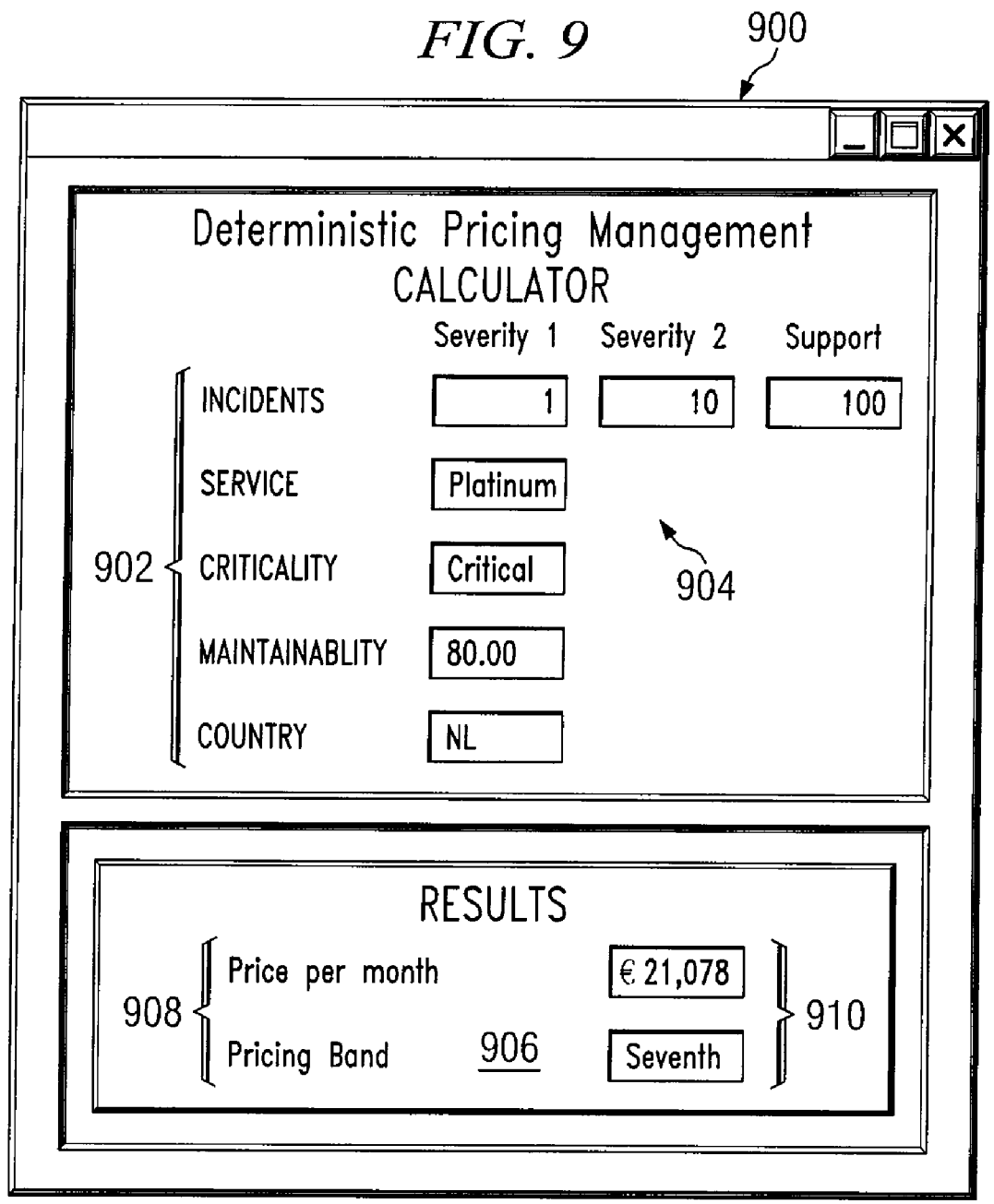

DETERMINISTIC PRICING MANAGEMENT OF A PORTFOLIO OF ONE OR MORE APPLICATIONS

TECHNICAL FIELD OF THE INVENTION

This invention relates generally to management of services and more particularly to deterministic pricing management of a portfolio of one or more applications.

BACKGROUND

Entities such as business enterprises, referred to as contractors, often contract with other entities such as other business enterprises, referred to as customers (or clients) to provide one or more services to the customers. For example, a contractor may enter into a contract with a customer for the contractor to provide services relating to one or more applications. The services contemplated by the contract may include development services, enhancement services, maintenance services, or any other suitable services. For example, in the software development field, a development project may refer to a collection of work tasks, with each task having a specific start and end date and a specific software product (e.g., one or more applications) to be delivered. Pricing these services can be challenging from the perspective of both the contractor and the customer.

SUMMARY

According to the present invention, disadvantages and problems associated with previous techniques for management of services may be reduced or eliminated.

In certain embodiments, a method for deterministic pricing management of a portfolio of one or more applications comprises, for each of the one or more applications: (1) receiving information associated with the application for a plurality of pricing drivers comprising one or more business pricing drivers and one or more maintainability pricing drivers, each pricing driver associated with a corresponding set of categories; (2) determining, for each business pricing driver and based on the received information, a particular category from the corresponding set of categories for the business pricing driver; (3) generating a business index based on the determined particular categories for the business drivers; (4) generating a maintainability index based on the received information; and (5) generating a composite index based on the generated business and maintainability indices. The method comprises determining one or more pricing bands based on the generated composite indices of the one or more applications, associating each of the applications with a corresponding pricing band, and determining a price for each of the applications based on the corresponding pricing band for the application.

In certain embodiments, a method for deterministic pricing management of a portfolio of one or more applications comprises, for each of the one or more applications receiving information associated with the application for a plurality of pricing drivers each associated with a corresponding set of categories. The plurality of pricing drivers comprise: (1) a set of business pricing drivers that comprises a number-of-incidents pricing driver, a service pricing driver, and a criticality pricing driver; and (2) a maintainability pricing driver. The method comprises, for each of the one or more applications: (1) determining, for each business pricing driver and based on the received information, a particular category from the set of categories corresponding to the business pricing driver; (2) generating a business index based on the determined particular categories for the business drivers; (3) generating a maintainability index based on the received information; and (4) generating a composite index based on the generated business and maintainability indices. The method comprises determining one or more pricing bands based on the generated composite indices of the one or more applications, associating each of the applications with a corresponding pricing band, and determining a price for each of the applications based on the pricing band for the application.

Particular embodiments of the present invention may provide one or more technical advantages. In certain embodiments, the present invention may be used to determine a price and/or cost structure for a fixed price contract for services. In certain embodiments, the present invention provides an integrated deterministic method not only to estimate prices and/or costs based on the scope of work, but to manage portfolio support based on competitive productivity according to various criteria (e.g., geography, business unit, or any other suitable criteria). In certain embodiments, the present invention may be used to manage portfolios of any suitable type of services.

In certain embodiments, the present invention prices services for a portfolio of one or more applications in a manner that is substantially equitable for both the customer and the contractor, such that the risk is shared more evenly than with conventional techniques for pricing application services. In certain embodiments, the present invention assists the contractor by facilitating a reduction in the cost of meeting one or more contractual obligations and may be used as a strategic component in bidding for contracts. The present invention may open the potential for additional revenue streams on fixed price contracts. In certain embodiments, the present invention increases profitability over the long term due to leveraging of teams and meeting of productivity targets, while keeping a fixed price. The present invention may enhance customer satisfaction, which in certain embodiments may be due to the transparency of the pricing mechanism provided by the deterministic pricing model. The present invention may facilitate a more collaborative dialogue around questions that may be raised by the deterministic pricing of the present invention that are not possible with conventional techniques.

In certain embodiments, the techniques provided by the present invention place a greater focus on portfolio management solutions and in creating methods that are easier to generalize and more economical to deploy over a wider geographic area (potentially globally). In certain embodiments, inclusion of a management component is a significant improvement over conventional techniques that typically focused only on cost determination and solution integration or fixed pricing resolution. In certain embodiments, no time and materials or Full Time Equivalent (FTE/FTP) and no function points are necessary for pricing determination. For example, in certain embodiments, the FTEs and FTPs are used exclusively for the calibration functions of the present invention.

In certain embodiments, the present invention provides a suite of one or more tools. Conventional techniques for managing a portfolio of applications typically lacked management focus and were based primarily on time and materials. Additionally, conventional tool sets were complex, fragmentary, lacked integration and focus on the life cycle. In contrast, certain embodiments of the present invention emphasize managing the pricing of a portfolio through all its phases, which may simplify use of the application for deterministic portfolio management.

Tools provided by certain embodiments of the present invention may provide certain advantages to the contractor of services. For example, the tools may reduce the cost of meeting contractual obligations by re-using and leveraging a set of tools already developed instead of developing a new set of tools for each customer. As another example, in the long term, this set of tools may continually evolve by using newer technologies that could increase the ability to be leveraged concurrently by multiple accounts. In certain embodiments, the present invention capitalizes on past experience and takes advantage of functional approaches that are calibrated to satisfy both the contractor's and the customer's needs and/or desires.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which:

FIG. 3 illustrates an example set of pricing drivers, categories for each pricing driver, and a relative weight for each pricing driver, according to certain embodiments of the present invention;

FIG. 4 illustrates a table that includes example criteria for determining the category of the service pricing driver to assign to an application, according to certain embodiments of the present invention;

FIG. 5 illustrates a more detailed example method for deterministic pricing management of a portfolio of one or more applications according to certain embodiments of the present invention;

FIG. 6 illustrates a graph of example pricing bands, according to certain embodiments of the present invention;

FIGS. 8A-8B illustrate an example life cycle for two services contracts, according to certain embodiments of the present invention; and FIG. 9 illustrates an example graphical user interface (GUI) for a calculator tool, according to certain embodiments of the present invention.

DESCRIPTION OF EXAMPLE EMBODIMENTS

Figure 1:
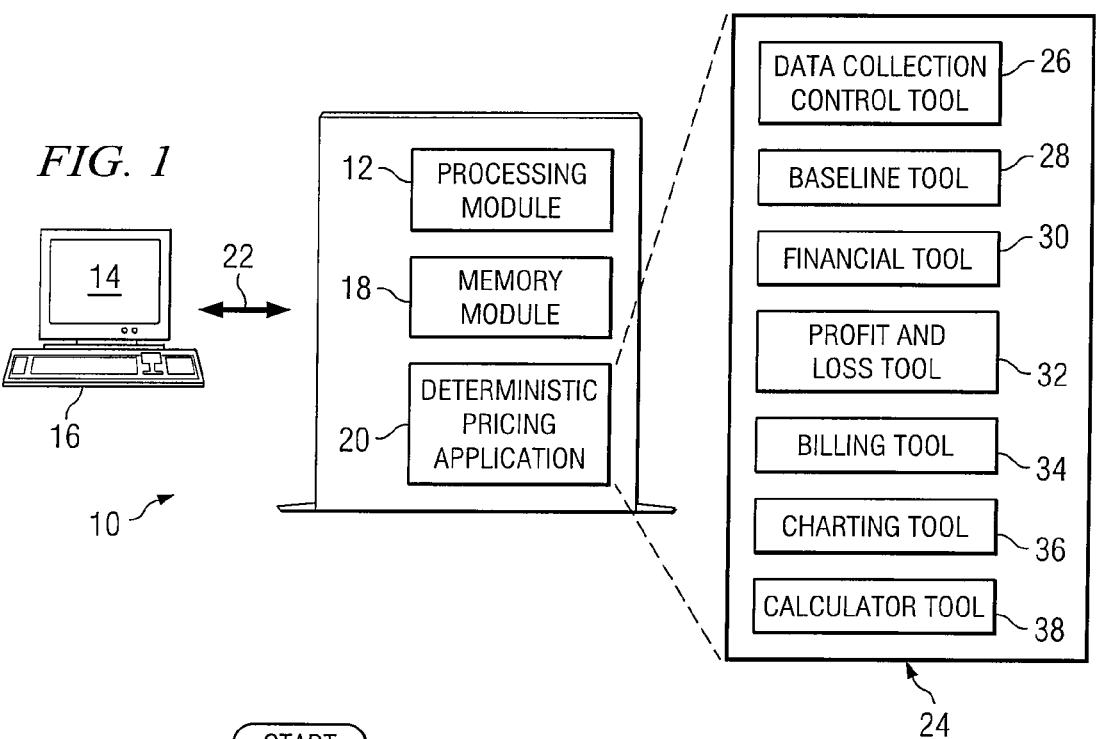
FIG. 1 illustrates an example system for deterministic pricing management of a portfolio of one or more applications, according to certain embodiments of the present invention.

FIG. 1 illustrates an example system 10 for deterministic pricing management of a portfolio of one or more applications, according to certain embodiments of the present invention. System 10 includes a processing module 12, a display module 14, one or more input devices 16, one or more memory modules 18, and a deterministic pricing application 20. Although an example implementation of system 10 is illustrated and primarily described, the present invention contemplates any suitable implementation of system 10.

System 10 may include one or more computer systems at one or more locations that may share data storage, communications, or other resources according to particular needs. For example, system 10 may include a computer system, such as a personal computer (PC), which in certain embodiments might include a desktop or laptop PC. Although system 10 is described primarily as a PC, the present invention contemplates system 10 being any suitable type of computer system, according to particular needs. For example, system 10 could include a client-server system. System 10 may include any suitable input devices, output devices, mass storage media, processors, memory, or other suitable components for receiving, processing, storing, and communicating information. Furthermore, system 10 may operate using any suitable platform, according to particular needs. The operations of system 10 may be implemented in any suitable combination of software, firmware, and hardware.

Processing module 12 may include one or more processing units. Processing units may include one or more microprocessors, controllers, or any other suitable computing devices or resources. Processing module 12 may work, either alone or with other components of system 10, to provide the functionality of system 10 described herein. For example, operations performed by processing module 12 may be performed collectively by processing module 12 and memory module 22.

System 10 includes one or more display modules 14, each of which may include a computer monitor, television, projector, or any other suitable type of display device. System 10 includes one or more input devices 16, which may be used by a user of system 10 to interact with processing module 12, display module 14, and any other suitable components of system 10. Input devices 16 may include a keyboard, a mouse, or any other suitable input devices. Although particular input devices 16 are illustrated and described, the present invention contemplates system 10 receiving input from a user in any suitable manner. For example, display device 14 may include touch-screen capabilities. As another example, one or more applications running on processing module 12 may interact with system 10 to interactively select certain inputs. As yet another example, system 10 may include voice recognition capabilities such that a user of system 10 may speak into an input device 16 (e.g., a microphone) to input commands or data.

System 10 may include or otherwise be associated with one or more memory modules 18. Each memory module 18 may take the form of volatile or non-volatile memory including, without limitation, magnetic media, optical media, random access memory (RAM), read-only memory (ROM), removable media, or any other suitable memory component. In certain embodiments, memory module 18 comprises one or more databases, such as one or more Structured Query Language databases or any other suitable types of databases. Memory module 18 may be local to or remote from the one or more processing units 12 of system 10.

The components of system 10, such as processing module 12, display module 14, input devices 16, and memory module 18 may be local to or geographically remote from one another, according to particular needs. For example, processing module 12 may be geographically remote from display module 14 and/or input devices 16. The components of system 10 may communicate with one another, either directly or indirectly, using a communication link 22. In certain embodiments, communication link 22 may include one or more computer buses, local area networks (LANs), metropolitan area networks (MANs), wide area networks (WANs), a global computer network such as the Internet, or any other wireline, optical, wireless, or other links.

System 10 or portions of system 10 may be associated with an entity such as a business enterprise. The business enterprise may be a contractor seeking to enter into or manage existing services contracts, in any suitable combination, with one or more customers. Additionally or alternatively, system 10 may be associated with one or more customers that wish to receive services or manage existing services from a contractor. In certain embodiments, system 10 implements a deterministic pricing model that may be used to price services for a portfolio of one or more applications. For example, the deterministic pricing model may be used to determine the price of a services contract, the costs of a services contract, or both. For purposes of this description, the term "application" is meant to refer to any suitable combination of software, firmware, and hardware, such that the services being priced or otherwise managed according to the deterministic pricing model may include service for any suitable combination of software, firmware, and hardware.

The present invention may be used to price any suitable type of services. Typically, services work performed on an application (e.g., by systems engineers, programmers, managers, support staff, and other suitable personnel) may be classified into three categories: development services, enhancement services, and maintenance services. Development services may include the creation of new solutions to problems solved by an existing application or the replacement of an existing application. Generally, a new application may be developed as one project, or it may be developed in phases, with a deliverable for each phase for example. Enhancement services may include the creation, installation, and integration of new functions, typically in response to a customer's or user's changes in requirements. Enhancement services may include any new functions that are needed to improve efficiency or enhance the level of service that the application provides. Maintenance services may include the correction of errors caused by any of a variety of different items or tasks, including but not limited to software programs, hardware, networks, scheduling, job control language, and software upgrades or changes. Maintenance services may also include the correction of an application that fails to perform to the original functional specifications.

System 10 may include deterministic pricing application 20, which may include any suitable combination of software, firmware, and hardware. In certain embodiments, portions or all of deterministic pricing application 20 may be implemented using MICROSOFT EXCEL or another suitable spreadsheet program; however, the present invention is not intended to be so limited. In certain embodiments, deterministic pricing application 20 implements the deterministic pricing model to facilitate determining the price of a services contract, the costs of a services contract, or both.

Conventional techniques for pricing services contracts for one or more applications often rely primarily on time and materials requirements for pricing the services. In contrast, the deterministic pricing model of the present invention is based on a set of pricing drivers, which may be agreed upon between the contractor and the customer, set by the contractor, set by the customer, or determined in any other suitable manner. The pricing drivers may be selected in an attempt to determine what, other than time or materials, drives the price of servicing the portfolio of one or more applications. The pricing drivers may be selected according to any suitable criteria, but generally may be considered characteristics of the work to be performed (e.g., the services to be provided by the contractor for the portfolio of one or more applications). These characteristics may be isolatable and quantifiable, according to the deterministic pricing model. The characteristics may be either subjective or objective. Example pricing drivers may include a number-of-incidents pricing driver, a service pricing driver, a criticality pricing driver, and a maintainability pricing driver. These example pricing drivers are described in more detail below, with reference to FIG. 3 for example. Although these particular pricing drivers are primarily described, the present invention contemplates using any suitable pricing drivers, according to particular needs.

One or more of the pricing drivers may be classified as business pricing drivers and one or more pricing drivers may be classified as maintainability pricing drivers. A business pricing driver may include a pricing driver that is driven by the customer. A maintainability pricing driver may include a pricing driver that is driven by the contractor or a company associated with the contractor. With respect to the example pricing drivers described briefly above, the one or more business pricing drivers may include the number-of-incidents pricing driver, the service pricing driver, and the criticality pricing driver, and the one or more maintainability pricing drivers may include the maintainability pricing driver.

A set of one or more categories may be defined for each pricing driver such that each pricing driver is associated with a corresponding set of categories. These categories may differentiate the characteristics of the work to be performed. The characteristics may be agreed upon between the contractor and the customer, set by the contractor, set by the customer, or determined in any other suitable manner. The characteristics may be used to define criteria for determining the appropriate category to assign to an application for the pricing driver. Example categories and criteria for the example pricing drivers described briefly above (e.g., the number-of-incidents pricing driver, the service pricing driver, the criticality pricing driver, and the maintainability pricing driver) are described in more detail below with reference to FIGS. 3-4. The categories and criteria for determining the appropriate category for an application may be documented, if appropriate.

Each category may be associated with a predefined weight level that can be used to quantify that category. In certain embodiments, the constructive cost model (COCOMO) II may be used to define the weight levels for the categories of one or more of the pricing drivers, although the present invention contemplates define the weight levels in any suitable manner.

As will be described in more detail below, each of the pricing drivers may be assigned a relative weight such that the total of all of the relative weights of all of the pricing drivers is one hundred percent. These relative weights may be agreed upon by the contractor and the customer, determined by the customer, determined by the contractor, or determined in any other suitable manner. Additionally, these relative weights may or may not be adjusted each time a set of inputs are processed using the model, or as the model is calibrated (as described below).

To set up the deterministic pricing model according to certain embodiments of the present invention, one or more pricing drivers that will be used for deterministic pricing management may be determined. These pricing drivers may include one or more business drivers and one or more maintainability drivers. In the particular example implementation primarily described throughout this description, the pricing drivers comprise number of incidents, service, criticality, and maintainability. In this example, the number of incidents, service, and criticality pricing drivers are considered business drivers, and the maintainability pricing driver comprises the only maintainability driver. Although particular numbers and types of pricing drivers are primarily described, the present invention contemplates incorporating any suitable number and types of pricing drivers in the deterministic pricing model.

In continuing to set up the deterministic pricing model, one or more categories may be defined for each pricing driver. Additionally, for each pricing driver, criteria may be defined for determining which category applies to a particular application. The criteria may be agreed upon between the contractor and the customer, set by the contractor, set by the customer, or determined in any other suitable manner. In certain embodiments, the customer is primarily responsible for defining the categories and criteria for the one or more business pricing drivers, and the contractor is primarily responsible for defining the categories and criteria for the one or more maintainability pricing drivers. Additionally, the weight levels for the categories of the pricing drivers may be defined. As just one example, the COCOMO II may be used to define the weight levels for certain categories.

In further continuing to set up the deterministic pricing model, relative weights may be assigned to each pricing driver. For example, each pricing driver may be assigned a relative weight such that the total of the relative weights of all of the pricing drivers is one hundred percent. An example assignment of weights is described below with reference to FIG. 3. The relative weights may be agreed upon between the contractor and the customer, set by the contractor, set by the customer, or determined in any other suitable manner.

Once the deterministic pricing model is set up, it may be applied to a portfolio of one or more applications for deterministic pricing management. Deterministic pricing application 20 may be operable to perform portions or all of the functionality associated with deterministic pricing management of the one or more applications. Additionally or alternatively, a user or other component of system 10 may perform certain steps or otherwise interact with system 10 to facilitate the functionality associated with deterministic pricing management of the one or more applications.

In operation of an example embodiment of system 10, system 10 may receive data regarding each application in a portfolio of one or more applications. For example, the received data may include information to be input into the deterministic pricing model for determining a prices for the one or more applications. The received data includes information for each application that can be used to determine, for each pricing driver, which category to assign to the application. In certain embodiments, the data includes business information associated with the application. In the particular example described briefly above and described more fully below with reference to FIGS. 3-6, the data may include information regarding the number of incidents for the application, the service level for the application, and the criticality of the application. Additionally or alternatively, in certain embodiments, the data include maintainability information associated with the application. Although the data is described primarily as being received, the term receives is intended to include system 10 accessing the data in any suitable manner, according to particular needs.

System 10, for each application, may determine for each of the one or more business drivers a particular category to assign to the application based on the data received for the application. Each category may be assigned numeric weight level, which may allow the category determined for the application for the business pricing driver to be quantified. System 10, for each application, may determine for each of the one or more maintainability drivers a particular category to assign to the application based on the data received for the application.

In certain embodiments, a maintenance index for each application may be determined based on the data received for the application. The particular category of the maintenance pricing driver may be determined for the application according to the maintenance index determined for the application. Each category of the maintenance pricing driver may be assigned a numeric weight level, which may allow the category assigned to an application for the maintenance pricing driver to be quantified.

System 10 may generate a business index for each application based on the particular categories assigned to each of the business drivers for the application. In certain embodiments, to calculate the business index for an application, system 10 may multiply, for each business pricing driver, the numeric weight level of the particular category determined for the application for the business pricing driver by the relative weight assigned to the business pricing driver. This computation may result in a weighted business driver value for the business pricing driver. The weighted business driver values for each of the business pricing drivers may be summed to determine the business index for the application.

System 10 may generate a composite index for each application based on the business index generated for the application and the particular category assigned to the maintainability driver. In certain embodiments, to calculate the composite index for an application, the business index for the application may be summed with the assigned numeric weight of the particular category assigned to the application for the maintainability pricing driver.

One or more pricing bands for pricing the one or more applications of the portfolio may be generated. The one or more pricing bands may be generated based on the composite indices generated for the one or more applications. In certain embodiments, the number of generated pricing bands is equal to the number of categories in the set of categories that corresponds to the maintainability index pricing driver. Each pricing band may be associated with a pricing index. A particular example technique for generating the one or more pricing bands is described in more detail below with reference to FIGS. 2 and 5. Additionally, FIG. 6 illustrates a graph of example pricing bands according to certain embodiments of the present invention. System 10 may associate each of the one or more applications with a corresponding pricing band for determining a price for the application.

System 10 may determine a price for each application according to the pricing band assigned to the application. In certain embodiments, the price for an application may be determined using the pricing index associated with the pricing band corresponding to the application. As described above, in certain embodiments, the sum of prices assigned to each of the applications may be equal to the total amount allocated for servicing the one or more applications of the portfolio.

As described above, deterministic pricing application 20 implements the deterministic pricing model to facilitate determining the price of a services contract, the costs of a services contract, or both. In an example scenario, deterministic pricing application 20 may implement the deterministic pricing model to determine prices associated with each application of a fixed price services contract. The contractor and the customer may agree that a total amount of X dollars are available to pay for the services for a portfolio of applications. It should be noted that the present invention contemplates using any suitable currency or other measure of value. The X dollars may be thought of as a whole pie, and one goal of deterministic pricing management may be to divide the pie (i.e., the X dollars) appropriately among the one or more applications by allocating slices of the pie to the one or more applications. Each pricing band may define a particular type of slice (e.g., each type of slice may be a different size, representing different dollar amounts out of the X dollars). The number of slices may be equal to the number of applications in the portfolio of applications, such that each application is allocated at least a portion of the pie. The deterministic pricing model facilitates determining how to slice the pie with a predetermined number of slices and predetermined types (i.e., sizes) of slices. It should be understood that this analogy is merely provided for example purposes and should not be used to limit the present invention.

Portions or all of deterministic pricing application 20 may be provided as one or more tools, referred to collectively as tools 24. In certain embodiments, the functionality of the present invention may be provided through tools 24. Tools 24 may comprise any suitable combination of software, firmware, and hardware. In certain embodiments, a portion or all of tools 24 may be implemented using MICROSOFT EXCEL and MICROSOFT VISUAL BASIC FOR APPLICATIONS (VBA) macros; however, the present invention contemplates implementing tools 24 in any suitable manner using any suitable programs. As just one example, the platform could be changed to use technology for network-based tools. Although particular numbers and types of tools 24 are illustrated and described, the present invention contemplates any suitable number and types of tools 24, according to particular needs. For example, additional functionality may be provided using one or more additional tools 24, functionality associated with particular tools 24 may be omitted in certain embodiments, and the functionality provided by some or all of the tools 24 may be combined in any suitable number of tools 24. Moreover, the present invention contemplates implementing the functionality of the present invention in any suitable manner, according to particular needs.

System 10 may include a data collection control tool 26. Data collection control tool 26 may be operable to perform one or more of the following functions: gathering data, tracking changes in data, and managing the data collection process (e.g., including managing completion progress, data aggregation, and any other suitable functions). In certain embodiments, data collection tool 26 is operable to provide data collection even in the absence of an established metrics program.

System 10 may include a baseline tool 28. Baseline tool 28 may be operable to establish a baseline that can be communicated through multiple phases of a services life cycle and to multiple audiences. Baseline tool 28 may comprise a collection of tools that are operable to perform one or more of the following functions: pricing determination; data analysis during the pricing drivers' refining phase and correlation analysis for monitoring performance; calibration of deterministic pricing model prices and automatic calibration to optimize price index; automatic scaling to adjust price scale and price beyond the top band; productivity management used to monitor calibration; conformance for managing compliance and acceptance of the outcomes of the model; support for charting, and any other suitable functions.

System 10 may include a financial tool 30. Financial tool 30 may provide support for multiple contracts, countries, and years of the life cycle, which may include productivity targets for particular geographic locations (e.g., particular offices of the contractor), and other suitable functionality. Financial tool 30 may provide contract projections, model projections for the baseline with breakdowns per client business unit and per the contractor's countries, and model projections for billing with similar breakdowns.

System 10 may include a profit and loss tool 32. Profit and loss tool 32 may provide the contractor with the actual profit or loss incurred due to deterministic pricing. Profit and loss tool 32 may determine variances against cost and the net profit margin.

System 10 may include a billing tool 34. Billing tool 34 may process billing for baseline applications, as well as new or changed applications, according to multiple contract years. In certain embodiments, financial tool 30 and billing tool 34 may provide financial and billing data management that can be used to simultaneously drive the process and become the outcome of the process.

System 10 may include a charting tool 36. Charting tool 36 may provide multiple views into the data. In certain embodiments, charting tool 36 may cooperate with baseline tool 28 to generate one or more of the views into the data.

System 10 may include a calculator tool 38. Calculator tool 38 may be integrated with other tools 24 as part of a tool suite (e.g., one or more of tools 24), or it may be provided as a stand-alone version. Calculator tool 38 may condense all or a portion of the functionality of the present invention in a simple tool to perform "spot pricing," play "what-if" scenarios, and price new or changed applications. An example GUI for calculator tool 38 is illustrated and described below with reference to FIG. 9.

In pricing services contracts using conventional techniques, contractors typically estimate the cost and price of servicing applications by estimating the time (e.g., hours) and materials (e.g., staff or other resources) that will be needed to perform the services. One costing technique includes estimating the number of staff FTEs needed to perform the tasks associated with providing the services. One FTE may be equal to one month of effort (e.g., twelve FTEs equal one staff year). However, these FTE-based estimates are highly subjective and typically inaccurate. Moreover, effort-based or FTE-based estimates are generally unique to specific projects. This type of estimate may not provide a normalized or standardized method which can be used by customers and contractors for enterprise-wide planning and forecasting. In a customer-vendor relationship, effort-based costing may not be conducive to savings based on improved productivity and decreases in effort. Moreover, numerous external factors (e.g., project schedule, reusability, reliability, work environment, user communication, project risk) can contribute to the ultimate cost of servicing an application, which may not be controllable during the project, and therefore, may not be accounted for adequately with an FTE-based estimate.

Particular embodiments of the present invention may provide one or more technical advantages. In certain embodiments, the present invention may be used to determine a price/cost structure for a fixed price contract for services. In certain embodiments, the present invention provides an integrated deterministic method not only to estimate costs and/or prices based on the scope of work, but to manage portfolio support based on competitive productivity according to various criteria (e.g., geography, business unit, or any other suitable criteria). In certain embodiments, the present invention may be used to manage portfolios of any suitable type of services.

In certain embodiments, the present invention prices services for a portfolio of one or more applications in a manner that is substantially equitable for both the customer and the contractor, such that the risk is shared more evenly than with conventional techniques for pricing application services. In certain embodiments, the present invention assists the contractor by facilitating a reduction in the cost of meeting one or more contractual obligations and may be used as a strategic component in bidding for contracts. The present invention may open the potential for additional revenue streams on fixed price contracts. In certain embodiments, the present invention increases profitability over the long term due to leveraging of teams and meeting of productivity targets, while keeping a fixed price. The present invention may enhance customer satisfaction, which in certain embodiments may be due to the transparency of the pricing mechanism provided by the deterministic pricing model. The present invention may facilitate a more collaborative dialogue around questions that may be raised by the deterministic pricing of the present invention that are not possible with conventional techniques.

In certain embodiments, the techniques provided by the present invention place a greater focus on portfolio management solutions and in creating methods that are easier to generalize and more economical to deploy over a wider geographic area (potentially globally). In certain embodiments, inclusion of a management component is a significant improvement over conventional techniques that typically focused only on cost determination and solution integration or fixed pricing resolution. In certain embodiments, no time and materials or FTE/FTP and no function points are necessary for pricing determination. For example, in certain embodiments, the FTEs and FTPs are used exclusively for the calibration functions of the present invention.

In certain embodiments, the present invention provides a suite of one or more tools 24. Conventional techniques for managing a portfolio of applications typically lacked management focus and were based primarily on time and materials. Additionally, conventional tool sets were complex, fragmentary, lacked integration and focus on the life cycle. In contrast, certain embodiments of the present invention emphasize managing the service of a portfolio through all its phases, which may simplify use of the application.

Tools 28 provided by certain embodiments of the present invention may provide certain advantages to the contractor of services. For example, tools 28 may reduce the cost of meeting contractual obligations by re-using and leveraging a set of tools 28 already developed instead of developing a new set of tools 28 for each customer. As another example, in the long term, this set of tools 28 may continually evolve by using newer technologies that could increase the ability to be leveraged concurrently by multiple accounts. In certain embodiments, the present invention capitalizes on past experience and takes advantage of functional approaches that are calibrated to satisfy both the contractor's and the customer's needs and/or desires.

Figure 2:
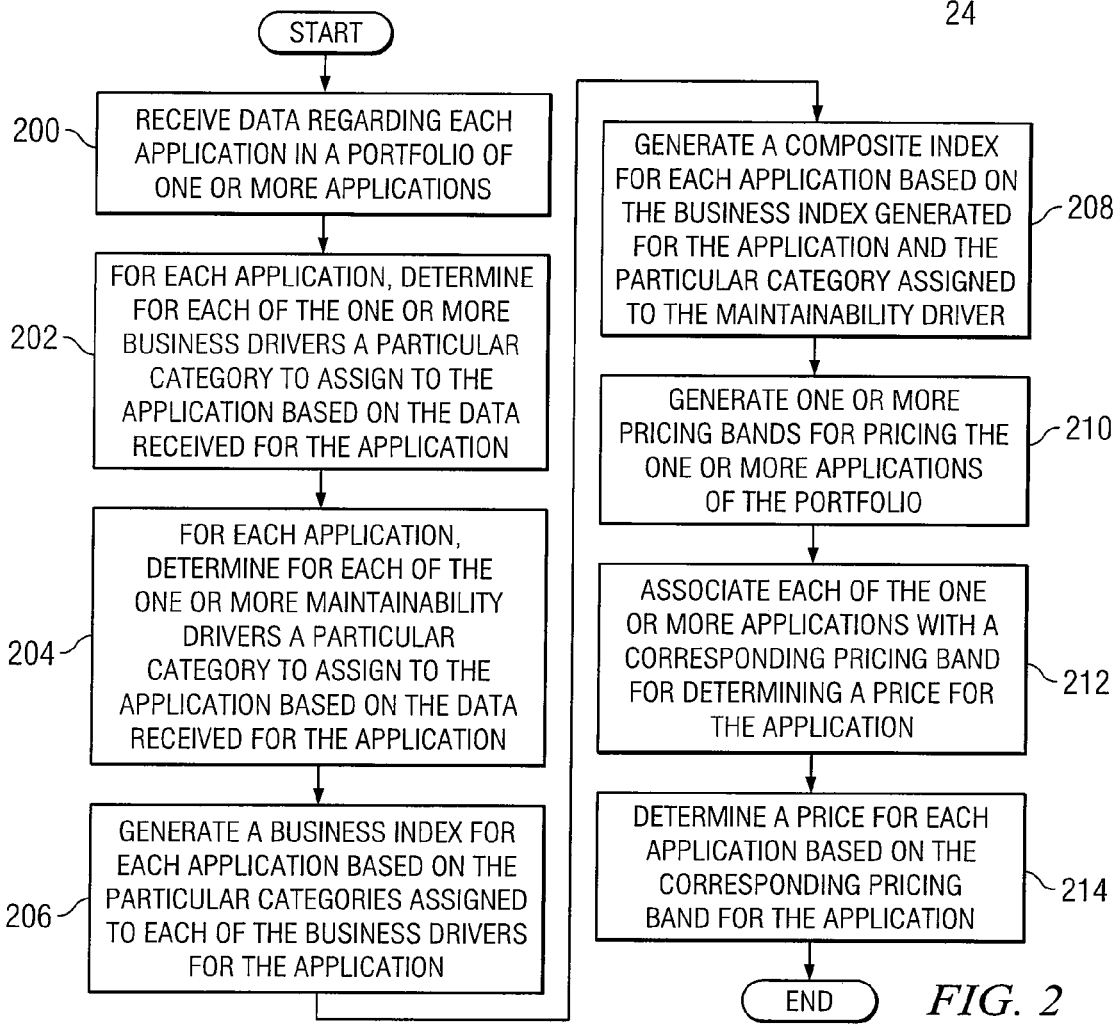
FIG. 2 illustrates an example method for deterministic pricing management of a portfolio of one or more applications, according to certain embodiments of the present invention.

FIG. 2 illustrates an example method for deterministic pricing management of a portfolio of one or more applications, according to certain embodiments of the present invention. Portions of the method may be performed manually, or the entire method may be performed automatically (e.g., by deterministic pricing application 20). As described above, the deterministic pricing model includes a plurality of pricing drivers, one or more of which may be a business pricing driver and one or more of which may be a maintainability pricing driver. Each pricing driver is associated with a set of categories that may be assigned to the pricing driver for an application. A numeric weight level may be associated with each category of a pricing driver. Additionally, each pricing driver may be assigned a relative weight such that the total of the relative weights of all of the pricing drivers is equal to one hundred percent.

At step 200, system 10 (e.g., deterministic pricing application 20) receives data regarding each application in a portfolio of one or more applications. For example, the received data may include information to be input into the deterministic pricing model for determining a prices for the one or more applications. The received data includes information for each application that can be used to determine, for each pricing driver, which category to assign to the application. In certain embodiments, the data includes business information associated with the application. In the particular described briefly above and described more fully below with reference to FIGS. 3-6, the data may include information regarding the number of incidents for the application, the service level for the application, and the criticality of the application. Additionally or alternatively, in certain embodiments, the data include maintainability information associated with the application. Although the data is described primarily as being received, the term receives is intended to include system 10 accessing the data in any suitable manner, according to particular needs.

At step 202, system 10, (e.g., deterministic pricing application 20) for each application, may determine for each of the one or more business drivers a particular category to assign to the application based on the data received for the application. For example, system 10 (e.g., deterministic pricing application 20) may determine for the application a particular category for the number-of-incidents pricing driver. As another example, system 10 (e.g., deterministic pricing application 20) may determine for the application a particular category for the service pricing driver. As another example, system 10 (e.g., deterministic pricing application 20) may determine for the application a particular category for the criticality pricing driver. Each category may be assigned numeric weight level, which may allow the category determined for the application for the business pricing driver to be quantified.

At step 204, system 10, (e.g., deterministic pricing application 20) for each application, may determine for each of the one or more maintainability drivers a particular category to assign to the application based on the data received for the application. In certain embodiments, a maintenance index for each application may be determined based on the data received for the application. The particular category of the maintenance pricing driver may be determined for the application according to the maintenance index determined for the application. Each category of the maintenance pricing driver may be assigned a numeric weight level, which may allow the category assigned to an application for the maintenance pricing driver to be quantified.

At step 206, system 10 (e.g., deterministic pricing application 20) may generate a business index for each application based on the particular categories assigned to each of the business drivers for the application. In certain embodiments, to calculate the business index for an application, system 10 (e.g., deterministic pricing application 20) may multiply, for each business pricing driver, the numeric weight level of the particular category determined for the application for the business pricing driver by the relative weight assigned to the business pricing driver. This computation may result in a weighted business driver value for the business pricing driver. In this example, the weighted business driver values for each of the business pricing drivers may be summed to determine the business index for the application.

At step 208, system 10 (e.g., deterministic pricing application 20) may generate a composite index for each application based on the business index generated for the application and the particular category assigned to the maintainability driver. In certain embodiments, to calculate the composite index for an application, the business index for the application may be summed with the assigned numeric weight level of the particular category assigned to the application for the maintainability pricing driver.

At step 210, one or more pricing bands for pricing the one or more applications of the portfolio may be generated. The one or more pricing bands may be generated based on the composite indices generated for the one or more applications. In certain embodiments, the number of generated pricing bands is equal to the number of categories in the set of categories that corresponds to the maintainability index pricing driver. Each pricing band may be associated with a pricing index. A particular example technique for generating the one or more pricing bands is described in more detail below with reference to FIG. 5. Additionally, FIG. 6 illustrates a graph of example pricing bands according to certain embodiments of the present invention. At step 212, system 10 (e.g., deterministic pricing application 20) may associate each of the one or more applications with a corresponding pricing band for determining a price for the application. At step 214, system 10 (e.g., deterministic pricing application 20) may determine a price for each application according to the pricing band assigned to the application. In certain embodiments, the price for an application may be determined using the pricing index associated with the pricing band corresponding to the application. As described above, in certain embodiments, the sum of prices assigned to each of the applications may be equal to the total amount allocated for servicing the one or more applications of the portfolio.

FIGS. 3-6 illustrate more particular example implementations of the deterministic pricing model, according to certain embodiments of the present invention.

FIG. 3 illustrates an example set of pricing drivers 300, categories 302 for each pricing driver 300, and relative weight 304 for each pricing driver 300, according to certain embodiments of the present invention. It should be understood that the specifics described with reference to FIG. 3 are for example purposes only. For example, although particular pricing drivers 300 are illustrated and described, the present invention contemplates using any suitable pricing drivers 300 in the deterministic pricing model, according to particular needs.

The example illustrated in FIG. 3 includes four pricing drivers 300: a number-of-incidents pricing driver 300a, a service pricing driver 300b, a criticality pricing driver 300c, and a maintainability pricing driver 300d. In this example, number-of-incidents pricing driver 300a, a service pricing driver 300b, and a criticality pricing driver 300c make up business drivers 306 of this example deterministic pricing model. Additionally, maintainability pricing driver 300d makes up the only maintainability pricing driver 308 of this example deterministic pricing model.

Each pricing driver 300 is assigned a set of one or more corresponding categories 302. The category may be agreed upon by the customer and contractor, determined according to certain information about an application or portfolio of applications, or determined in any other suitable manner, either manually or automatically. Additionally, each pricing driver 300 may be assigned a relative weight 304. Relative weight 304 may be agreed upon by the customer and contractor, determined according to certain information about an application or portfolio of applications, or determined in any other suitable manner, either manually or automatically.

Number-of-incidents pricing driver 300a may be used to classify numbers of incidents for servicing an application. Categories 302 for number-of-incidents pricing driver 300a, according to this example, include Low, Medium, and High. Additional details regarding example criteria for determining the appropriate category 302 for number-of-incidents pricing driver 300a are described below in Table 1. In certain embodiments, an incident includes something that causes action (e.g., service) by the contractor. For example, one or more levels of action may be defined. These levels may be referred to as "Severity 1," "Severity 2," and "Support." Levels Severity 1 and Severity 2 may include actions that need to be performed substantially quickly to prevent failure of operation for the customer (e.g., Severity 1 may be slightly more important than Severity 2).

In certain embodiments, the number of incidents is based on a moving average over a historical time period (e.g., a moving average over the last three months). Information regarding the number of incidents over the last three months may be collected or otherwise accessed and the moving average may be computed. This moving average may be computed for each severity level. The moving average for each severity level may then be weighted according to the numeric weight level assigned to its corresponding severity level. The weighted moving average for each severity level may then be summed to determine the net number of incidents. The net number of incidents for an application may be used to determine the category 302 for number-of-incidents pricing driver 300a to assign to the application. For example, each category 302 for number-of-incidents pricing driver 300a may be assigned a range of values that can be compared to the net number of incidents for each application for determining which category 302 should be assigned to the application. The ranges for categories 302 of number-of-incidents pricing driver 300a may be determined dynamically, according to the net number of incidents values for some or all of the applications in the portfolio. Number-of-incidents pricing driver 300a may be considered a measurement of the size of an application. Additionally or alternatively, in certain embodiments, the size of an application may be measured using function points for the application.

Service pricing driver 300b may be used for specifying a level of service for an application. Categories 302 for service pricing driver 300b, according to this example, include Bronze, Silver, Gold, and Platinum. Additional details regarding example criteria for determining the appropriate category 302 for service pricing driver 300b are described below in Table 1. Moreover, additional details regarding example categories 302 for service pricing driver 300b are described below with reference to FIG. 4. In certain embodiments, the customer may determine the category 302 to assign to each application for service pricing driver 300b. As described in more detail below with reference to FIG. 4, in certain embodiments, service pricing driver 300b may be a function of two variables—window of service and number of regions. In certain embodiments, a customer may specify selections for these two variables, and a category 302 for service pricing driver 300b may be determined in response to those specifications. Additionally or alternatively, a customer may select a category 302 (e.g., the Gold package) for service pricing driver 300b, and the underlying values for these two variables may be predetermined based on mappings to the selected category 302.

Criticality pricing driver 300c may be used for specifying a criticality level for an application, such as how critical the application is to the customer's business. Categories 302 for criticality pricing driver 300c, according to this example, include Low, Medium, High, and Critical. Additional details regarding example criteria for determining the appropriate category 302 for criticality pricing driver 300c are described below in Table 1. In certain embodiments, the criteria for criticality pricing driver 300c are determined by the customer.

Additionally, the customer may determine, for each application, which category 302 of criticality to assign to that application. Categories 302 for criticality pricing driver 300c may define what the business criticality of an application is (e.g., why a particular application is more critical than another). In certain embodiments, the underlying concept of critically pricing driver 300c is that services for an application that poses a high criticality may cost more than services for an application that poses a lower criticality.

Maintainability pricing driver 300d may reflect a level of difficulty for maintaining or otherwise servicing an application. Categories 302 for maintainability pricing driver 300d, according to this example, include Very High, High, Average, Low, and Very Low. Additional details regarding example criteria for determining the appropriate category 302 for maintainability pricing driver 300d are described below in Table 1. In certain embodiments, as described in more detail below, the determination of how difficult it is to maintain an application may be made using a survey. For example, one or more employees of the contractor (e.g., those employees responsible for maintaining or otherwise servicing the application) may complete the survey. The answers to the survey questions may be quantified and a category 302 for maintainability driver 300d may be determined based on that number.

For example, a maintainability index may be generated based on the quantified responses to the questions of the survey. In certain embodiments, the higher the maintainability index for an application is, the easier the application is to maintain.

Each pricing driver 300 may be assigned a relative weight 304. As described above, relative weights 304 may be expressed as a percentage, and the total of relative weights 304 of pricing drivers 300 may be one hundred percent. In this example, number-of-incidents pricing driver 300a is assigned a weight of thirty percent, service pricing driver 300b is assigned a weight of twenty percent, criticality pricing driver 300c is assigned a weight of thirty percent, and maintainability pricing driver 300d is assigned a weight of twenty percent.

Continuing with the example described above with reference to FIG. 3, Table 1 below illustrates example pricing drivers 300 (e.g., number-of-incidents pricing driver 300a, service pricing driver 300b, criticality pricing driver 300c, and maintainability pricing driver 300d), categories 302 for each pricing driver 300, and criteria for determining a selected category 302 for each pricing driver 300. Based on the following example criteria, a category may be determined for each application in a portfolio (which may include one or more applications), an entire portfolio or other sub-group of applications, or on any other suitable basis.

TABLE 1

| DRIVER | CATEGORY | CRITERIA |
|---|---|---|
| NUMBER OF INCIDENTS PRICING DRIVER 300a | Low | $0 \leq$ Net Number of Incidents $\leq n$ (n = low threshold for number of incidents) |
|  | Medium | $n <$ Net Number of Incidents $\leq m$ (m = high threshold for number of incidents) |
|  | High | Net Number of Incidents $> m$ |
| SERVICE PRICING DRIVER 300b | Bronze | One region and normal service window (7:00 AM to 7:00 PM local time, business days). |
|  | Silver | One region and extended service window (7:00 AM to 7 PM local time, 7 days per week). |
|  | Gold | One region and full service window (24 hours per day, 7 days per week). |
|  | Platinum | Global and full service window (24 hours per day, 7 days per week). In certain embodiments, "Global" indicates that the support team is located in one region but supports the application globally over the full service window. |
| CRITICALITY PRICING DRIVER 300c | Low | Unavailability might cause little immediate damage to the customer. There will be a financial impact but these are likely to be restricted to the resource impact of repeating work or processes that have already been carried out. These will not be critical or sensitive applications. |
|  | Medium | Disruption of the application for more than four hours during the application service window (which may be defined in any suitable manner) may cause substantial damage to the customer or its stakeholders. The application is essential for ensuring the continuity of those products, services, or processes that play a vital part in primary banking operations or in the operations of important relations of the customer. Unavailability for a long period of time might cause substantial customer dissatisfaction, negative publicity, or lead to substantial financial losses or claims. Inability to use an application may leave the customer exposed to trading at a published price or unable to fulfill legal market obligations to manage risk and report trading activity. Unavailability will probably result in losses due to staff being unable to complete essential work in the required timeframes. |

TABLE 1-continued

| DRIVER | CATEGORY | CRITERIA |
|---|---|---|
| | High | The effects of unavailability are, to a large extent, internal and would in any event not lead to denial of service to a large number of clients or market facing teams. Disruption of the application for more than five minutes during the application service window (which may be defined in any suitable manner) can cause substantial damage to the customer or its stakeholders. The application is essential for insuring the continuity of those products, services, or processes that play a vital part in primary banking operations or in the operations of important relations of the customer. The application provides online services to a key or large group of clients. Unavailability might cause substantial customer dissatisfaction, negative publicity, or lead to substantial financial losses or claims. Inability to use an application may leave the customer exposed to trading at a published price or unable to fulfill legal market obligations to manage risk and report trading activity. |
| | Critical | Disruption of the application for any period of time during the application service window (which may be defined in any suitable manner) can cause substantial damage to the customer or its stakeholders. The application is essential for ensuring the continuity of those products, services, or processes that play a vital part in primary banking operations or in the operations of important relations of the customer. The application provides online services to a key or large group of clients. Unavailability might cause substantial customer dissatisfaction, negative publicity, or lead to substantial financial losses or claims. Inability to use an application may leave the customer exposed to trading at a published price or unable to fulfill legal market obligations to manage risk and report trading activity. |
| MAINTAINABILITY PRICING DRIVER 300d | Very Low | Relative to the highest quintile Maintainability Index (MI) of all applications. In certain embodiments, the number of categories for the maintainability driver is equal to the number of pricing bands. Any suitable number of maintainability categories may be used. As two examples, the number of maintainability categories may be five or nine, which may result in five or nine pricing bands, respectively. |
| | Low | Next quintile. |
| | Medium | Next quintile. |
| | High | Next quintile. |
| | Very High | Lowest quintile. |

FIG. 4 illustrates a table 400 that includes example criteria for determining the category 302 of service pricing driver 300b to assign to an application, according to certain embodiments of the present invention. Table 400 includes available categories 302 for service pricing driver 302b. In particular, the available categories 302 in this example are Bronze, Silver, Gold, and Platinum. The criteria for determining category 302 in this particular example are the time service is available (i.e., service windows 402) and the regions in which the service will be available (i.e., regions 404). Available service windows 402 include Normal (7:00 AM-7:00 PM, five days per week), Extended (7:00 AM-7:00 PM, seven days per week), and Full (twenty-four hours per day, seven days per week). In this particular example, a customer can select one region or global coverage for regions 404; however, the present invention contemplates fewer or additional options for regions 404 if appropriate. A region may include a city, a state, a country, a continent, or any other suitable division of geography, according to particular needs. The contents of table 400 (i.e., the available service categories 302 and associated criteria) may be agreed on by the contractor and the customer, specified by the customer, specified by the contractor, or defined in any other suitable manner.

As an example, a customer may request the normal service window 402 and one region 404 of coverage for an application, in which case the Bronze category 302 would be assigned to service pricing driver 300b for the application. As another example, a customer may request the full service window 402 and one region 404 of coverage for an application, in which case the Gold category 302 would be assigned to service pricing driver 300b for the application. Continuing with this example, if the customer were to select the global region 404 (along with the full service window 402) for an application, then the Platinum service category 302 would be assigned to service pricing driver 300b for the application.

FIG. 5 illustrates a more detailed example method for deterministic pricing management of a portfolio of one or more applications according to certain embodiments of the present invention. The example method described with reference to FIG. 5 continues with the example in which pricing drivers 300 comprise number-of-incidents pricing driver 300a, service pricing driver 300b, criticality pricing driver 300c, and maintainability pricing driver 300d. Additionally, continuing with the example, number-of-incidents pricing driver 300a, service pricing driver 300b, and criticality pricing driver 300c make up business drivers 306, and maintainability pricing driver 300d makes up the only maintainability pricing driver 308. Although these particular pricing drivers 300 are primarily described, the present invention contemplates any suitable pricing drivers 300, and suitable portions of the method described below may still be performed in substantially the same manner where appropriate. Those skilled in the art will understand how to apply the following method to different sets of pricing drivers 300. The description below of the method illustrated in FIG. 5 is provided in outline format, the numbers in the outline corresponding to the reference numerals in boxes of the flow chart of FIG. 5.

As described above, numeric weight levels may be assigned to categories 302 for each pricing driver 300. In certain embodiments, the numeric weight levels are defined by selecting an arbitrary odd number (e.g.: "3"), then subtracting half and adding half, as appropriate, to obtain additional numeric weight levels. In this example, the use of half is based on an assumption that it is equally likely for an application to fall within the variable's range of values. The distribution of the applications to be quantified using the numeric weight levels may not be uniform at all weight levels. As described above, in certain embodiments, the COCOMO II is used for establishing the numeric weight levels. For example, the COCOMO II scaling for five weight levels may follow a "standard distribution portfolio" and may be used for the weight level scale in this example deterministic pricing model as follows:

| Weight Level | 1 | 1.5 |
|---|---|---|
| | 2 | 3 |
| | 3 | 4.5 |
| | 4 | 7.5 |
| | 5 | 9 |

I. Pricing Drivers 300
  1.1. Number of Incidents Pricing Driver 300a
    1.1.1. For each application, the number of incidents per severity level (e.g., Severity 1, Severity 2, and Support) may be obtained over a period of time (e.g., one month). In certain embodiments, the period of time matches the effort data collection period for calibration (described below). In certain embodiments, the number of incidents for each of the severity levels is determined dynamically in response to receiving input. Additionally or alternatively, a three-month (or other) moving average may be used once available, although the present invention contemplates using any suitable average.
    1.1.2. The adjusted number of incidents per severity code may be obtained by applying a severity adjustment factor. In certain embodiments, the severity adjustment factor is an agreed multiplier indicating how many more a severity incident costs on average relative to the lowest severity (=1), such as the following for example:
      Severity 1: h=3×Number of Severity 1 incidents
      Severity 2: m=2×Number of Severity 2 incidents
      Support: l=1×Number of Support incidents
    1.1.3. The adjusted number of incidents (h+m+l) may be summed to obtain a net number of incidents.
    1.1.4. The applications may be sorted (e.g., in ascending order) by the net number of incidents. In certain embodiments, the lowest quartile (0–n) may be categorized as Low, the middle two quartiles (n+1–m) may be categorized as Medium, and the highest quartile (m+1–z) may be categorized as High.
    1.1.5. Each category 302 for number-of-incidents pricing driver 300a may be assigned a numeric weight level, as follows for example:

| Low: | 1.5 (net # incidents ≦ n) |
|---|---|
| Medium: | 3 (n < net # incidents ≦ m) |
| High: | 4.5 (net # incidents > m) |

Additional (or fewer) categories 302 for number-of-incidents pricing driver 300a may be included, which may make the model more (or less) sensitive to variation, provided there is a statistically significant number of applications in each new category.
    1.1.6. For each application determine a particular category 302 for number-of-incidents pricing driver 300a.
  1.2. Service Pricing Driver 300b
    1.2.1. The particular category 302 for service pricing driver 300b may be determined by applying certain criteria, such as the criteria shown in Table 1 for service pricing driver 300b. The numeric weight levels for each category 302 of service pricing driver 300b may be defined as follows, for example:

| Bronze: | 1.5 |
|---|---|
| Silver: | 3 |
| Gold: | 4.5 |
| Platinum: | 7.5 |

The weight level for the particular category 302 determined for the application for service pricing driver 300b quantifies the determination of the particular category 302 and may be assigned to the application for service pricing driver 300b.
    1.2.2. A particular category 302 for service pricing driver 300b may be determined for each application.
  1.3. Criticality Pricing Driver 300c
    1.3.1. The particular category 302 for criticality pricing driver 300c may be determined by applying certain criteria, such as the criteria shown in Table 1 for criticality pricing driver 300c. The numeric weight levels for each category 302 of service pricing driver 300c may be defined as follows, for example:

| | |
|---|---|
| Low: | 1.5 |
| Medium: | 3 |
| High: | 4.5 |
| Critical: | 7.5 |

The weight level for the particular category 302 determined for the application for criticality pricing driver 300c quantifies the determination of the particular category 302 and may be assigned to the application for criticality pricing driver 300c.

1.3.2. A particular category 302 for criticality pricing driver 300c may be determined for each application.

1.4. Maintainability Pricing Driver 300d 1.4.1. In certain embodiments, determining the particular category 302 of maintainability driver 50d to assign to each application of the portfolio may include completing the modified U.S. Air Force Operational Test and Evaluation Center (AFOTEC) survey for each application of the portfolio. This survey may use a Likert Scale. In certain embodiments, the AFOTEC survey includes fifty-six questions. Although this particular technique is primarily described, the present invention contemplates determining the particular category 302 of maintainability driver 50d to assign to each application of the portfolio in any suitable manner, according to particular needs. For example, a set of criteria may be defined in a similar manner to that described above with respect to service pricing driver 300b and criticality pricing driver 300c.

1.4.2. The AFOTEC score (e.g., 0-280) may be determined by adding up the numeric value of each response as follows, for example:

| ANSWER | SCORE |
|---|---|
| Completely Disagree | 0 |
| Strongly Disagree | 1 |
| Generally Disagree | 2 |
| Generally Agree | 3 |
| Strongly Agree | 4 |
| Completely Agree | 5 |
| Not Applicable | 3 |

("Not Applicable" may indicate a point of indifference regarding difficulty to maintain. Therefore, it carries a midpoint score.)

1.4.3. The maintainability index may be determined. In certain embodiments, the maintainability index is determined by normalizing the AFOTEC survey score using a ratio, such as 25/54. The ratio (e.g., 25/54) is used to normalize the full survey to the modified, calibrated survey.

1.4.4. A maintainability index category and corresponding weight levels may be determined by determining the maintainability index for each application and sorting the applications by their maintainability index (e.g., in descending order). In certain embodiments, the more difficult an application is to maintain, the lower the maintainability index will be for that application.

1.4.5.

| | | |
|---|---|---|
| The highest quintile is categorized as: | Very High | 1.5 |
| The next quintile is categorized as: | High | 3 |
| The following quintile is categorized as: | Average | 4.5 |
| The next quintile is categorized as: | Low | 7.5 |
| The lowest quintile is categorized as: | Very Low | 9 |

The maintainability index category may be established for each application.

II. Calculation 2.5 Weighting 2.5.1 As described above, each pricing driver 300 may be assigned a relative weight with respect to the other pricing drivers 300. This relative weight may be agreed upon between the contractor and the customer (or determined in any other suitable manner) by agreeing on a weighted percentage (p), as follows for example:

| | |
|---|---|
| Incidents | 30% |
| Service | 20% |
| Criticality | 30% |
| Maintainability | 20% |
| | 100% |

2.5.2 The weighted business driver may be generated by adding the corresponding percentage to the business driver category's weight=business driver category value*(1+(p/100))

2.5.3 The weighted business driver value may be generated for each business driver and for each application.

2.6 Business Index 2.6.1 The business index may be generated for each application by adding the weighted business driver values for: Incidents+Service+Criticality.

2.7 Composite Index 2.7.1 The composite index may be generated for each application by adding the business index and the weighted maintainability index category values: business index+maintainability index.

2.7.2 The applications of the portfolio may be sorted by the composite index (e.g., in ascending order). In certain embodiments, the lower the composite index of an application is, the easier the application is to maintain. As an example, the applications may be categorized as follows:
The lowest quartile is categorized as: Low
The middle two quartiles are categorized as: Medium
The highest quartile is categorized as: High 2.7.3 Each composite index category may be assigned a numeric weight level, as follows for example:

| | |
|---|---|
| Low | 1.5 |
| Medium | 3 |
| High | 4.5 |

2.7.4 The composite index category may be determined for each application.

2.8 Determination of Pricing Bands 2.8.1 The following may be determined for each composite index category:
average maintainability index=sum of all weighted maintainability indices within each category divided by the number of applications in the category.

average composite index=sum of all composite indices within each category divided the number of applications in the category.

2.8.2 For each composite index category, a pricing band ratio may be determined. In certain embodiments, the pricing band ratio=average composite index/average maintainability index.

2.8.3 A pricing band index may be generated by normalizing. For example, the pricing band index may be normalized using the following formula: pricing band ratio/pricing band ratio of the average category.

2.8.4 The pricing band index may be generated for each application. In certain embodiments, the deterministic pricing model of the present invention provides a pricing band index that can be broken down into any suitable number of statistically meaningful pricing ranges, if additional pricing bands are required for a finer scale for example.

2.8.5 The total amount allocated for the portfolio of applications in the data set may be entered into a MICROSOFT EXCEL SOLVE function to determine the average price per application. Although use of MICROSOFT EXCEL is primarily described, the present invention contemplates determining the average price per application in any suitable manner.

2.8.6 In certain embodiments, the average price per application is the price of the middle pricing band index (=1). The pricing band index of each application in the data set may be multiplied by the average price per application to determine the actual application price for each corresponding pricing band index range.

III. Feedback Loop 3.9 CALIBRATION—This particular example illustrates a manual technique for calibration; however, the present invention contemplates performing one or more automatic calibrations, if appropriate. Additionally, any other calibration methods, tools, and functionality may be used without departing from the spirit and scope of the present invention.

3.9.1 Obtain the average effort per application (e.g., in hours) for a period substantially equivalent to the period used to capture the number of incidents.

3.9.2 Establish the Full-Time Equivalent (FTP) hourly rate.

3.9.3 To determine an indicative pricing, obtain the current price per application for the designated period by multiplying effort by FTP rate.

3.9.4 Obtain the number of compliant applications by counting the number of applications with a current price within the corresponding pricing band index range.

3.9.5 Obtain the pricing band index size by counting all applications for each pricing band index range.

3.9.6 Calculate the correlation percent between the pricing band index size and the number of compliant applications using the following formula: ((Pricing Band Index Size−Compliant Applications)/Pricing Band Index Size)*100.

3.9.7 Establish an agreed acceptance threshold percent (e.g., lower than 100%) to determine what is an adequate level of compliance for all applications in each pricing index range.

3.9.8 If the correlation percent exceeds the acceptance threshold, then the outliers may be examined to determine if corrective actions may be appropriate to move the outliers into compliance with the corresponding pricing band index range.

3.9.9 If an inadequate number of applications do not comply with the parameters of the deterministic pricing model or if there are opportunities for improving the effectiveness of the deterministic pricing model, then adjusting the model by varying weights or performing regression analysis may help identify drivers that could sufficiently discriminate the outliers.

FIG. 6 illustrates a graph 600 of example pricing bands 602, according to certain embodiments of the present invention. X-axis 604 of graph 600 includes a range of values for the maintenance index (which, in certain embodiments, may be the numeric weight level for the category 302 of maintainability pricing driver 300$d$), and Y-axis 606 of graph 600 includes a range of values for the business index. Each application in the portfolio of applications being processed using the deterministic pricing model may be plotted and marked onto graph 600. The plotted applications are identified as diamonds in graph 600. System 10 may or may not actually generate graph 600 (or any other suitable representation of pricing bands 602). In certain embodiments, charting tool 36 may be operable to generate graph 600.

In certain embodiments, pricing bands 602 divide the range of values between a maximum value and minimum value into quartiles. The maximum value and minimum value may be determined in any suitable manner, according to particular needs. The first quartile (e.g., the lower quartile) is labeled as Low and may include the lowest twenty-five percent of the data. Pricing band 602$a$ comprises the first quartile. The second quartile (e.g., the median quartile) is labeled as Average and may include the middle half of the data. Pricing band 602$b$ comprises the second quartile. The third quartile (e.g., the upper quartile) is labeled as High and may include the highest twenty-five percent of the data. Pricing band 602$c$ comprises the third quartile. Although a particular number of pricing bands 602 are illustrated and primarily described, the present invention contemplates dividing the applications among any suitable number of pricing bands 602, according to particular needs. As described above, in certain embodiments, the number of pricing bands is equal to the number of categories 302 for maintainability pricing driver 300$d$.

Figure 7:
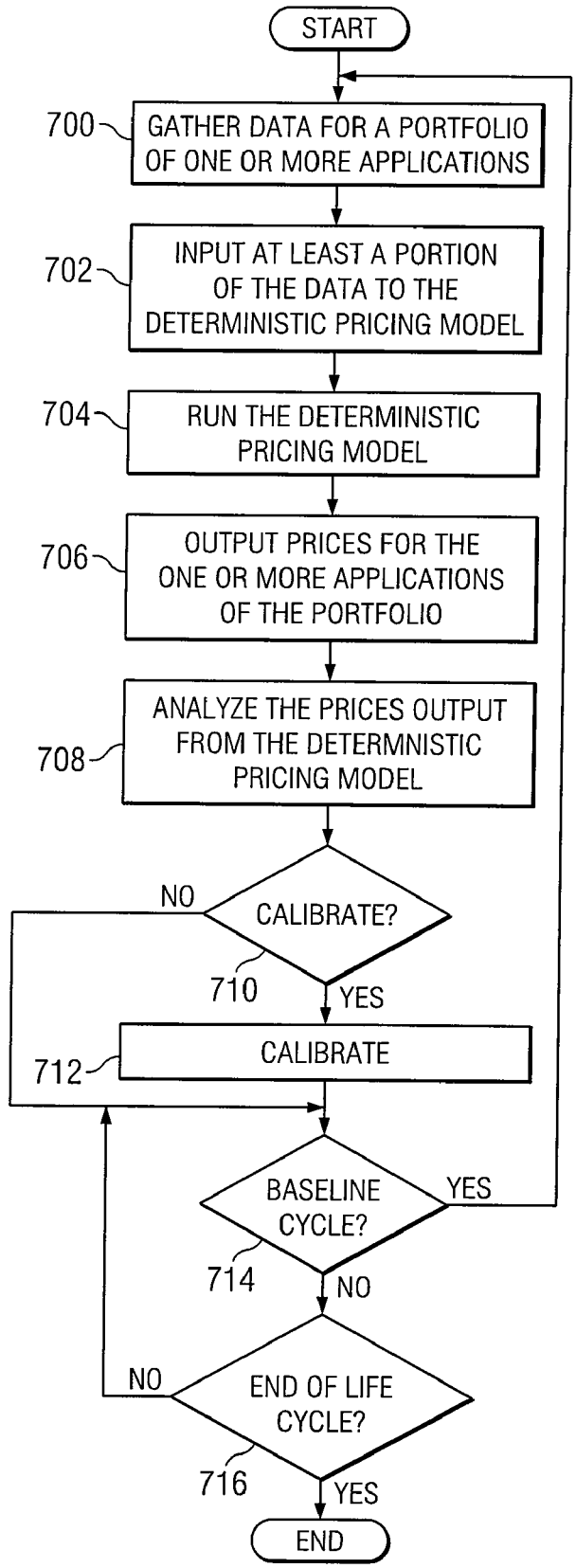
FIG. 7 illustrates a method of an example life cycle for use of the deterministic pricing model, according to certain embodiments of the present invention.

FIG. 7 illustrates a method of an example life cycle for use of the deterministic pricing model, according to certain embodiments of the present invention. It should be understood that the following method is merely an example.

At step 700, data may be gathered for a portfolio of applications. For example, this data may include data for each application that can be used for determining the appropriate category 302 of each pricing driver 300 to assign to the application. As another example, the data may include the total amount of money to be allocated among the one or more applications of the portfolio. As another example, this step may include gathering data for defining pricing drivers 300 and their corresponding sets of categories 302, criteria, and relative weights 304. The gathered data may include any other suitable information, according to particular needs.

At step 702, at least a portion of the gathered data is input into the deterministic pricing model. For example, deterministic pricing application 20 may receive the gather data from a user of system 10, access the gathered data, perform any combination of these two, or access the data in any other suitable manner according to particular needs. At step 704, the deterministic pricing model may be run. For example, deterministic pricing application 20 may process the data using the deterministic pricing model. At step 706, deterministic application 20 or another suitable component of system 10 may output prices for the one or more applications of the portfolio according to the deterministic pricing model.

At step 708, the prices output from the deterministic pricing model may be analyzed. For example, variances in the output data (e.g., the price per application) may be determined and analyzed. At step 710, a determination is made regarding whether calibration of the deterministic pricing model should be performed. For example, one or more persons associated with either or both of the contractor and the customer may determine whether calibration should be performed. Additionally or alternatively, system 10 may automatically determine whether calibration should be performed.

If it is determined at step 710 that calibration should be performed, then at step 712, calibration may be performed. Calibration may help to ensure the integrity of the deterministic pricing model. Calibration may include adjusting one or more parameters used in the deterministic pricing model. In certain embodiments, calibration may be performed in the manner described above with reference to FIG. 5. In certain embodiments, calibration may include analyzing variances against current support levels (e.g., prices or costs) and establishing a level of compliance with the predictions and prices correlations of the deterministic pricing model. In certain embodiments, calibration may include using productivity correlation checks and other verifications created to support the calibration function. Calibration may help identify and reduce outliers, and to adjust the levers for optimization of the deterministic pricing model.

Calibration may be manual or automated. In certain embodiments, automatic calibration begins once the manual reduction of outliers has been completed. Automatic calibration may automate the reduction of major variances by categorizing each application in its optimal pricing band using its current price as a reference. In certain embodiments, automatic calibration operates with baseline tool 28 and may be turned on or off (e.g., for purposes of producing the final pricing allocation among the one or more applications of the portfolio), according to particular needs.

In certain embodiments, an auto-scale function may be applied as a part of or separate from the calibration. The auto-scale function may provide deterministic pricing beyond the top pricing band by using a technique for pricing based on the price-per-incident. In certain embodiments, as a byproduct of automatic calibration for example, the deterministic pricing model may determine the average scale variance per pricing band, and may automatically adjust the pricing index of each application in baseline tool 28. This may improve the predictive power of the deterministic pricing model. In certain embodiments, this feature may be turned on or off, according to particular needs.

Other tools may be used as a part of maintaining the integrity of the deterministic pricing model. For example, an application acceptance threshold tool, a price correlation acceptance percentage tool, and other variance and correlation tools may be used and integrated into deterministic pricing application 20.

After calibration at step 710 is complete or if it is determined at step 710 that no calibration should be performed, then at step 714 it may be determined whether the life cycle is at a baseline cycle. In other words, it may be determined whether it is time to rerun the model for the portfolio of applications (e.g., including any new applications and minus any removed applications). Baselining may be performed at any suitable interval, whether regularly or otherwise, according to particular needs. If it is determined at step 714 that the life cycle is in a baseline cycle, then the method returns to step 700 to gather information to be input and run with the deterministic pricing model. If it is determined at step 714 that the life cycle is not in a baseline cycle, the at step 716 it may be determined whether it is the end of the life cycle. For example, it may be determined whether the services contract for the portfolio of applications is being terminated before the next baseline cycle. If it is determined at step 716 that it is not the end of the life cycle, then the method may return to step 714 to determine whether the life cycle is at a baseline cycle. If it is determined at step 716 that it is the end of the life cycle, then the method ends.

Figure 8A:
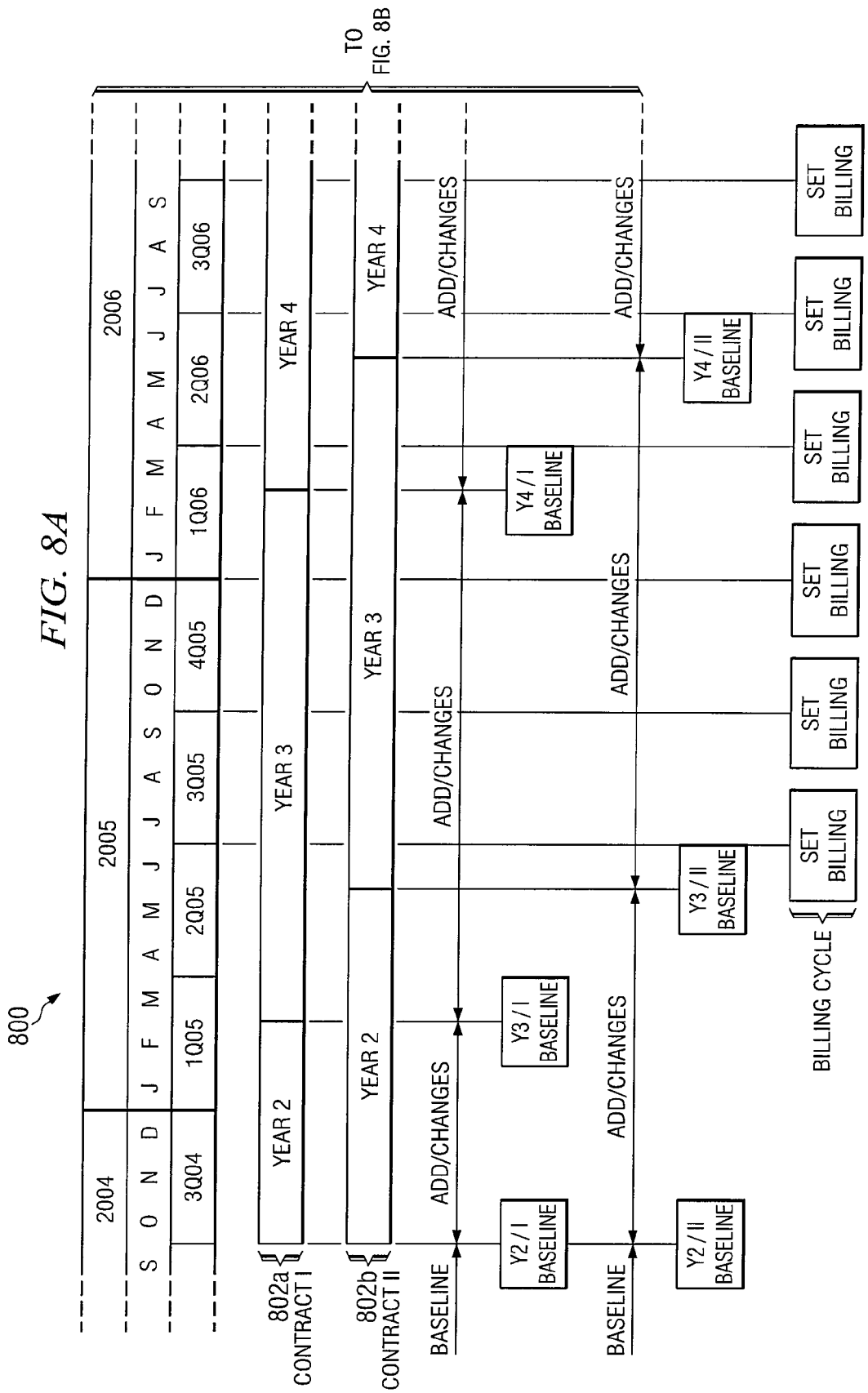

FIGS. 8A-8B illustrate an example life cycle 800 for two services contracts 802a and 802b, according to certain embodiments of the present invention. First contract 802a, as can be seen at reference numeral 804a, is associated with a first set of regions. Second contract 802b, as can be seen at reference numeral 804b, is for a second set of regions.

FIG. 9 illustrates an example GUI 900 for calculator tool 38, according to certain embodiments of the present invention. It should be noted that the illustrated GUI 900 merely provides an example implementation of a GUI that may be used with calculator tool 38. The present invention contemplates any suitable GUI, including for example those with different, more, or less functionality, and those that appear different than GUI 900. In certain embodiments, output device 14 of system 10 is operable to display GUI 900.

As described above, calculator tool 38 may be integrated with the other tools 24 as part of a tool suite (e.g., one or more of tools 24), or it may be provided as a stand-alone version. Calculator tool 38 may condense all or a portion of the functionality of the present invention in a simple tool to perform "spot pricing," play "what-if" scenarios, and price new or changed applications.

GUI 900 includes input selection labels 902. In this example, input selection labels 902 specify pricing drivers 300 (i.e., number-of-incidents pricing driver 300a (labeled as "Incidents"), service pricing driver 300b (labeled as "Service"), criticality pricing driver 300c (labeled as "Criticality"), and maintainability pricing driver 300d (labeled as "Maintainability")), as well as a label for specifying the country. GUI 900 includes boxes 904 adjacent to each label in which values may be input. For example, a user of GUI 900 may use an input device 16 of system 10 to input values into boxes 904. In the illustrated example, the specified value for Incidents at Severity 1 is 1, the specified value for Incidents at Severity 2 is 10, and the specified value for Incidents of Support is 100. Continuing with the illustrated example, the selected category 302 of Service is Platinum, the selected category 302 of Criticality is critical, and the selected value for Maintainability is 80.00. The selected country is the Netherlands.

GUI 200 includes a results area 906, which includes labels 908 for price-per-month and pricing band. The values indicated in boxes 910 adjacent to labels 908 may be determined in response to running the values specified above through the deterministic pricing model. As just example, calculator tool may spot price the application associated with these inputs based on a previously run baseline for a portfolio of applications. In this example in which the Netherlands is the selected country, the price is output in Euros (€21,078), and the pricing band 602 is indicated as the seventh pricing band.

Although particular methods have been described with reference to FIGS. 2, 5, and 7, the present invention contemplates any suitable methods in accordance with the present invention. Thus, certain of the steps described with reference to FIGS. 2, 5, and 7 may take place substantially simultaneously and/or in different orders than as shown and described. Moreover, components of system 10 may use methods with additional steps, fewer steps, and/or different steps, so long as the methods remain appropriate.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for deterministic pricing management of a portfolio of one or more applications, comprising: for each application in a portfolio of one or more applications, using a computer system: receiving, by an input device, information associated with the application for a plurality of pricing drivers, the plurality of pricing drivers comprising one or more business pricing drivers and one or more maintainability pricing drivers, each pricing driver associated with a corresponding set of categories; determining, by a processor, for each of the one or more business pricing drivers and based on the received information associated with the application, a particular category from the corresponding set of categories for the business pricing driver; generating, by the processor, a business index based on the determined particular categories for the one or more business ~drivers; generating, by the processor, a maintainability index based on the received information associated with the application; and generating, by the processor, a composite index based on the generated business index and the generated maintainability index; determining, by the processor, one or more pricing bands based on the generated composite indices of the one or more applications; associating by the processor each of the one or more applications with a corresponding pricing band; and determining, by the processor a price for each of the one or more applications based on the corresponding pricing band for the application.

2. The method of claim 1, wherein: each category in the set of categories corresponding to one of the pricing drivers is associated with a numeric weight level such that the category is quantifiable; and the method comprises, for each application, determining, for each pricing driver, the numeric weight level for the determined particular category of the pricing driver.

3. The method of claim 2, wherein: each pricing driver is assigned a relative weight; and generating the business index for each application comprises: multiplying, for each business pricing driver, the numeric weight level of the particular category determined for the application by the relative weight assigned to the business pricing driver to determine a weighted business driver value for the business pricing driver; and summing the weighted business driver values of the one or more business pricing drivers to determine the business index for the application.

4. The method of claim 2, comprising, for each application: determining a particular category for the maintainability driver based on the maintainability index generated for the application; determining the numeric weight level for the particular category to determine a maintainability index category value for the application.

5. The method of claim 4, wherein determining the composite index for each application comprises summing the business index for the application and the maintainability index category value for the application.

6. The method of claim 1, comprising: assigning a composite index category to each application based on the composite index of the application, each composite index category associated with a numeric weight level such that the composite index category is quantifiable; and determining, for each application, the numeric weight level for the composite index category assigned to the application.

7. The method of claim 1, wherein determining the one or more pricing bands comprises: determining a composite index category for each application; and determining a number of applications in each composite index category; for each composite index category: determining an average maintainability index of applications in the composite index category by summing weighted maintainability indices of the applications in the composite index category and dividing the sum by the number of applications in the composite index category; determining an average composite index of applications in the composite index category by summing the composite indices of the applications in the composite index category and dividing the sum by the number of applications in the composite index category; determining a pricing band ratio for the composite index category by dividing the average composite index for the composite index category by the average maintainability index for the composite index category; and determining a pricing band index of applications in the composite index category by dividing the pricing band ratio for the composite index category by an average pricing band ratio of the average composite index category, each pricing band associated with a corresponding pricing band index.

8. The method of claim 1, wherein determining the price for each of the one or more applications of the portfolio based on the pricing band assigned to the application comprises: determining an average price per application based on a total amount of money allocated for the one or more applications; multiplying, for each application, the pricing band index for the pricing band corresponding to the application by the average price per application to determine the price for the application.

9. The method of claim 1, further comprising: analyzing the prices assigned to the one or more applications in the portfolio of applications; and performing calibration by adjusting one or more parameters used throughout the method.

10. The method of claim 1, further comprising: receiving information associated with a new application regarding the plurality of pricing drivers; determining a price for the new application using the plurality of pricing drivers and the pricing bands determined for the portfolio of one or more applications.

11. The method of claim 1, wherein the one or more business pricing drivers comprise one or more of the following: a number-of-incidents pricing driver, the one or more categories for the number-of-incidents pricing driver defining numbers of incidents for servicing the portfolio of applications; a service pricing driver for specifying a level of service for an application, the one or more categories for the service pricing driver comprising defining levels of service; and a criticality pricing driver for specifying a criticality level for an application, the one or more categories for the criticality pricing driver defining levels of criticality.

12. The method of claim 1, wherein the one or more maintainability pricing drivers comprise a single maintainability pricing driver and reflect a level of difficulty for maintaining an application, the one or more categories for the maintainability pricing driver defining a plurality of levels of difficulty for servicing the application.

13. The method of claim 1, wherein the one or more pricing bands comprise a number of pricing bands equal to the number of categories in the set of categories corresponding to the maintainability pricing driver.

14. A system for deterministic pricing management of a portfolio of one or more applications, the system comprising one or more processing units and one or more memory units, the one or more processing units operable to: for each application in a portfolio of one or more applications: receive information associated with the application for a plurality of pricing drivers, the plurality of pricing drivers comprising one or more business pricing drivers and one or more maintainability pricing drivers, each pricing driver associated with a corresponding set of categories; determine, for each of the one or more business pricing drivers and based on the received information associated with the application, a particular category from the corresponding set of categories for the business pricing driver; generate a business index based on the determined particular categories for the one or more business pricing drivers; generate a maintainability index based on the received information associated with the application; and generate a composite index based on the generated business index and the generated maintainability index; determine one or more pricing bands based on the generated composite indices of the one or more applications; associate each of the one or more applications with a corresponding pricing band; and determine a price for each of the one or more applications based on the corresponding pricing band for the application.

15. The system of claim 14, wherein: each category in the set of categories corresponding to one of the pricing drivers is associated with a numeric weight level such that the category is quantifiable; and the one or more processing units are operable to, for each application, determine, for each pricing driver, the numeric weight level for the determined particular category of the pricing driver.

16. The system of claim 15, wherein: each pricing driver is assigned a relative weight; and generating the business index for each application comprises: multiplying, for each business pricing driver, the numeric weight level of the particular category determined for the application by the relative weight assigned to the business pricing driver to determine a weighted business driver value for the business pricing driver; and summing the weighted business driver values of the one or more business pricing drivers to determine the business index for the application.

17. The system of claim 15, wherein the one or more processing units are operable to, for each application: determining a particular category for the maintainability driver based on the maintainability index generated for the application; determining the numeric weight level for the particular category to determine a maintainability index category value for the application.

18. The system of claim 17, wherein determining the composite index for each application comprises summing the business index for the application and the maintainability index category value for the application.

19. The system of claim 14, wherein the one or more processing units are operable to: assign a composite index category to each application based on the composite index of the application, each composite index category associated with a numeric weight level such that the composite index category is quantifiable; and determine, for each application, the numeric weight level for the composite index category assigned to the application.

20. The system of claim 14, wherein determining the one or more pricing bands comprises: determining a composite index category for each application; and determining a number of applications in each composite index category; for each composite index category: determining an average maintainability index of applications in the composite index category by summing weighted maintainability indices of the applications in the composite index category and dividing the sum by the number of applications in the composite index category; determining an average composite index of applications in the composite index category by summing the composite indices of the applications in the composite index category and dividing the sum by the number of applications in the composite index category; determining a pricing band ratio for the composite index category by dividing the average composite index for the composite index category by the average maintainability index for the composite index category; and determining a pricing band index of applications in the composite index category by dividing the pricing band ratio for the composite index category by an average pricing band ratio of the average composite index category, each pricing band associated with a corresponding pricing band index.

21. The system of claim 14, wherein determining the price for each of the one or more applications of the portfolio based on the pricing band assigned to the application comprises: determining an average price per application based on a total amount of money allocated for the one or more applications; multiplying, for each application, the pricing band index for the pricing band corresponding to the application by the average price per application to determine the price for the application.

22. The system of claim 14, wherein the one or more processing units are further operable to: analyzing the prices assigned to the one or more applications in the portfolio of applications; and performing calibration by adjusting one or more parameters used throughout the method.

23. The system of claim 14, wherein the one or more processing units are further operable to: receiving information associated with a new application regarding the plurality of pricing drivers; determining a price for the new application using the plurality of pricing drivers and the pricing bands determined for the portfolio of one or more applications.

24. The system of claim 14, wherein the one or more business pricing drivers comprise one or more of the following: a number-of-incidents pricing driver, the one or more categories for the number-of-incidents pricing driver defining numbers of incidents for servicing the portfolio of applications; a service pricing driver for specifying a level of service for an application, the one or more categories for the service pricing driver comprising defining levels of service; and a criticality pricing driver for specifying a criticality level for an application, the one or more categories for the criticality pricing driver defining levels of criticality.

25. The system of claim 14, wherein the one or more maintainability pricing drivers comprise a single maintainability pricing driver and reflect a level of difficulty for maintaining an application, the one or more categories for the maintainability pricing driver defining a plurality of levels of difficulty for servicing the application.

26. The system of claim 14, wherein the one or more pricing bands comprise a number of pricing bands equal to the number of categories in the set of categories corresponding to the maintainability pricing driver.

27. Software for deterministic pricing management of a portfolio of one or more applications, the software being embodied in a non-transitory computer-readable storage medium and when executed operable to: for each application in a portfolio of one or more applications: receive information associated with the application for a plurality of pricing drivers, the plurality of pricing drivers comprising one or more business pricing drivers and one or more maintainability pricing drivers, each pricing driver associated with a corresponding set of categories; determine, for each of the one or more business pricing drivers and based on the received information associated with the application, a particular category from the corresponding set of categories for the business pricing driver; generate a business index based on the determined particular categories for the one or more business pricing drivers; generate a maintainability index based on the received information associated with the application; and generate a composite index based on the generated business index and the generated maintainability index; determine one or more pricing bands based on the generated composite indices of the one or more applications; associate each of the one or more applications with a corresponding pricing band; and determine a price for each of the one or more applications based on the corresponding pricing band for the application.

28. A method for deterministic pricing management of a portfolio of one or more applications, comprising: for each application in a portfolio of one or more applications, using a computer system: receiving, by an input device, information associated with the application for a plurality of pricing drivers each associated with a corresponding set of categories, the plurality of pricing drivers comprising: a set of business pricing drivers that comprises a number-of-incidents pricing driver, a service pricing driver, and a criticality pricing driver; and a maintainability pricing driver; determining, by a processor, for each of the one or more business pricing drivers and based on the received information associated with the application, a particular category from the set of categories corresponding to the business pricing driver; generating, by the processor, a business index based on the determined particular categories for each of the one or more business drivers; generating, by the processor, a maintainability index based on the received information associated with the application; and generating, by the processor, a composite index based on the generated business index and the generated maintainability index; determining, by the processor, one or more pricing bands based on the generated composite indices of the one or more applications; associating, by the processor, each of the one or more applications with a corresponding pricing band; and determining, by the processor, a price for each of the one or more applications based on the pricing band for the application.

29. The method of claim 28, wherein each category in the set categories corresponding to the number-of-incidents pricing driver is associated with a range of a number of incidents for servicing an application and reflects a severity level of the number of incidents.

30. The method of claim 29, wherein at least a portion of the received information for the application comprises historical data regarding the number of incidents for the application, the particular category for the number-of-incidents pricing driver being determined based on the historical data.

31. The method of claim 28, wherein the service pricing driver is for specifying a level of service for an application, the set of categories corresponding to the service pricing driver defining levels of service.

32. The method of claim 31, wherein the set of categories corresponding to the service business pricing driver are defined according to both a service window for the application and a number of regions for which service is available for the application.

33. The method of claim 28, wherein the criticality pricing driver is for specifying a criticality level for the application, the set of categories corresponding to the criticality pricing driver defining levels of criticality.

34. The method of claim 28, wherein the maintainability pricing driver is for specifying a level of difficulty for maintaining an application, the one or more categories for the maintainability pricing driver defining a plurality of levels of difficulty for servicing the application.

35. The method of claim 28, comprising generating the maintainability index for each application by: summing responses to a survey regarding the application, each response associated with a numeric value; multiplying the sum by a ratio to determine the maintainability index.

36. The method of claim 35, comprising determining a maintainability index category by: sorting the applications in descending order according to their associated maintainability indices; based on a predetermined number of levels, classifying each application into one or more levels, each level associated with a numeric factor; and multiplying the maintainability index for each application by the numeric factor for the level in which the application is classified.

37. The method of claim 36, wherein generating the composite index comprises summing, for each application, the business index for the application and the weighted maintainability index category value for the application.

* * * * *

UNITED STATES PATENT AND TRADEMARK OFFICE
CERTIFICATE OF CORRECTION

PATENT NO. : 8,386,354 B2
APPLICATION NO. : 11/534099
DATED : February 26, 2013
INVENTOR(S) : Alejandro R. Zanlongo Page 1 of 1

It is certified that error appears in the above-identified patent and that said Letters Patent is hereby corrected as shown below:

In the Claims:

In column 27, line 25, in Claim 1, delete "~drivers;" and insert -- pricing drivers; --, therefor.

In column 31, line 31, in Claim 28, delete "business" and insert -- business pricing --, therefor.

In column 31, line 44, in Claim 29, delete "set" and insert -- set of --, therefor.

Signed and Sealed this
Twenty-eighth Day of May, 2013

Teresa Stanek Rea
*Acting Director of the United States Patent and Trademark Office*